United States Patent
Chen et al.

(10) Patent No.: US 7,989,990 B2
(45) Date of Patent: Aug. 2, 2011

(54) AUTOMATIC SHUT OFF APPARATUS FOR ELECTRONIC DEVICE

(75) Inventors: Ming-Ke Chen, Shenzhen (CN); Xiao-Zhu Chen, Shenzhen (CN); Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 163 days.

(21) Appl. No.: 12/422,307

(22) Filed: Apr. 13, 2009

(65) Prior Publication Data
US 2010/0236910 A1 Sep. 23, 2010

(30) Foreign Application Priority Data
Mar. 17, 2009 (CN) .......................... 2009 1 0300904

(51) Int. Cl.
*H01H 43/04* (2006.01)

(52) U.S. Cl. ...................................................... 307/141
(58) Field of Classification Search ................. 307/141, 307/141.4; 700/296; 713/320
See application file for complete search history.

(56) References Cited

U.S. PATENT DOCUMENTS

| | | | | |
|---|---|---|---|---|
| 5,432,578 A | * | 7/1995 | Suzuki | 396/281 |
| 5,552,685 A | * | 9/1996 | Young et al. | 318/400.32 |
| 7,158,394 B2 | * | 1/2007 | Takahashi et al. | 363/49 |
| 7,393,260 B2 | * | 7/2008 | Yamaguchi | 446/456 |

* cited by examiner

*Primary Examiner* — Albert W Paladini
(74) *Attorney, Agent, or Firm* — Zhigang Ma

(57) ABSTRACT

An automatic shut off apparatus for an electronic device includes an input circuit, a timing circuit, a control circuit, and a switch circuit. The input circuit is to receive a designated power-off time delay for the electronic device. The control circuit is to receive the designated power-off time delay from the input circuit, and output a control signal. The timing circuit is to time according to the control signal, and output an instruction signal in response to designated power-off time being reached. The switch circuit is to shut off power of the electronic device according to the instruction signal.

14 Claims, 4 Drawing Sheets

AUTOMATIC SHUT OFF APPARATUS FOR ELECTRONIC DEVICE

BACKGROUND

1. Technical Field

The present disclosure relates to automatic shut off apparatuses for electronic devices, and particularly to an apparatus having an automatic power-off function for an electronic device at a designated power-off time.

2. Description of Related Art

Electronic devices use various types of power sources. In normal operation, users may activate power sources to commence use of the electronic devices, but may forget to shut off the power sources after they are done, which wastes electricity.

DETAILED DESCRIPTION

Figure 1:
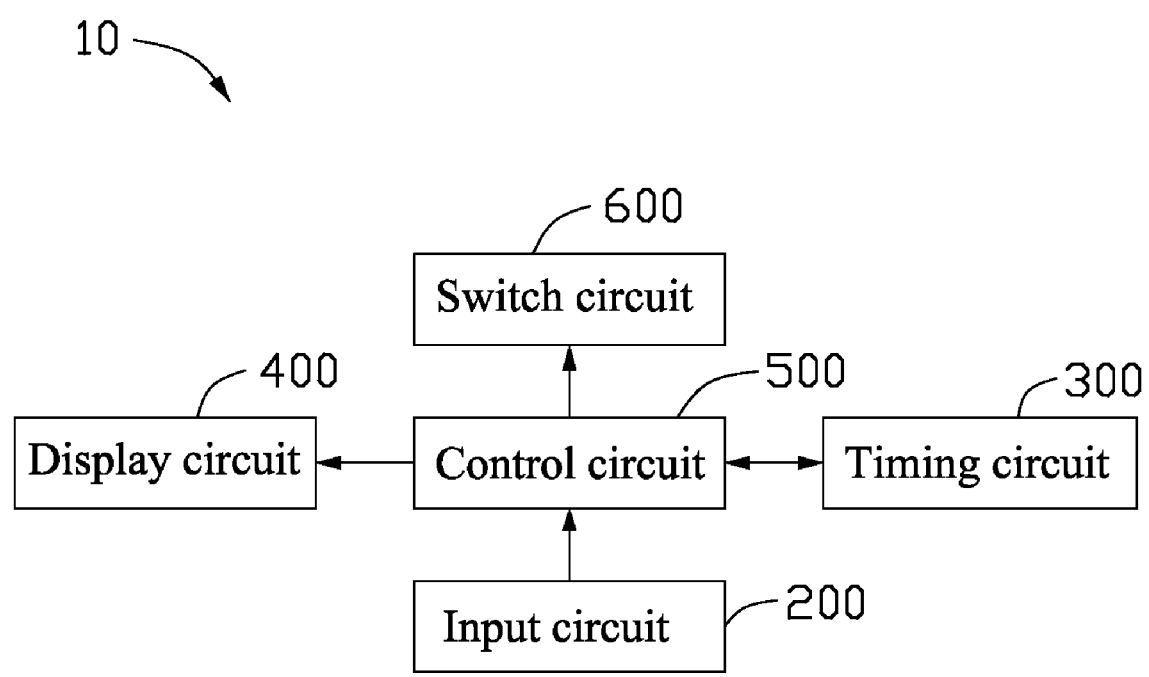
FIG. 1 is a block diagram of an exemplary embodiment of an automatic shut off apparatus for an electronic device.
Figure 4:
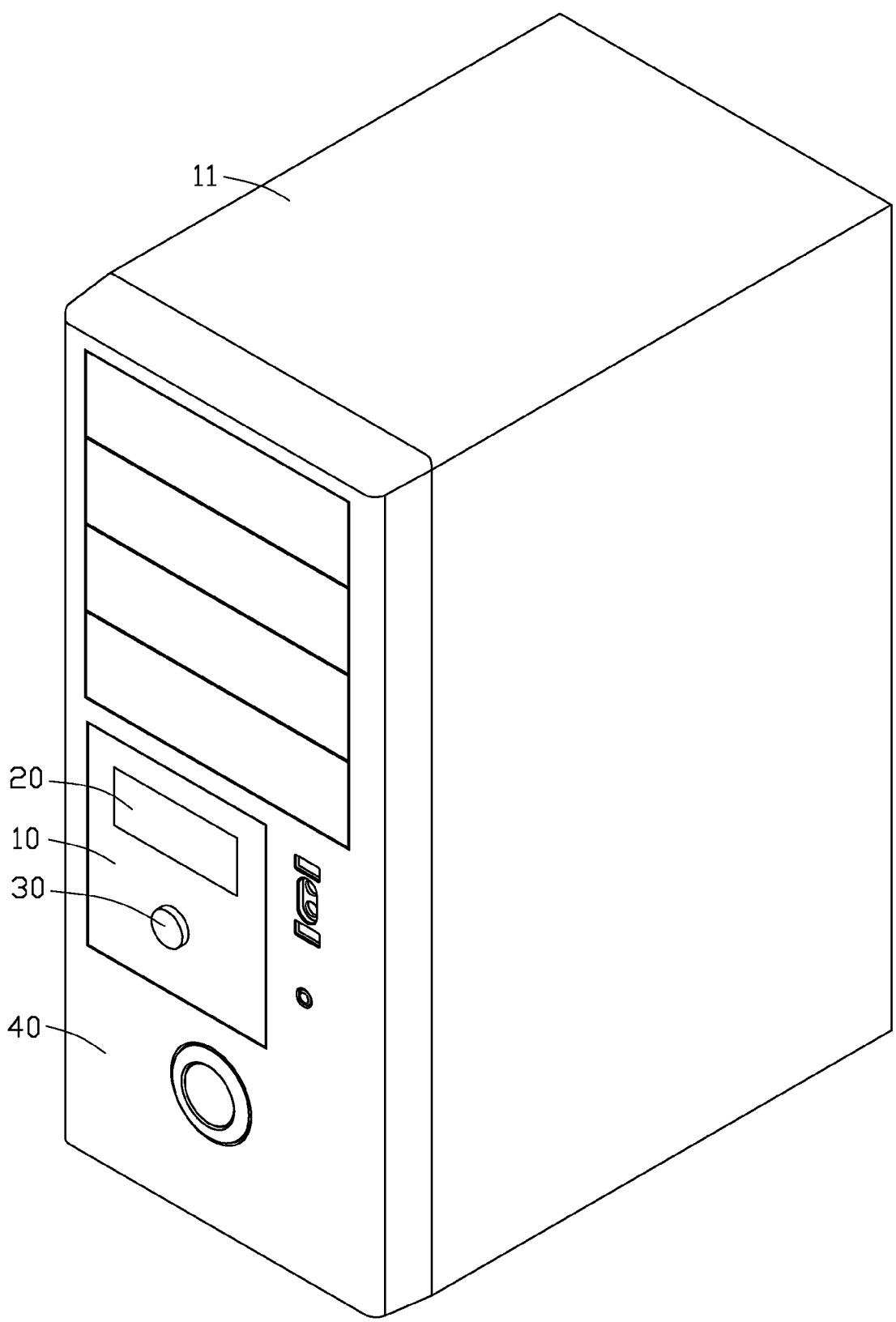
FIG. 4 is an isometric view of an exemplary embodiment of the automatic shut off apparatus for an electronic device which is set on an enclosure of an electronic device.

Referring to FIGS. 1 and 4, an exemplary embodiment of an apparatus 10 is set on a front panel (not labeled) of an enclosure 40 of the electronic device 11, to automatically shut off the electronic device 11 at a designated power-off time. The apparatus 10 includes an input circuit 200, a timing circuit 300, a display circuit 400, a control circuit 500, and a switch circuit 600. In one embodiment, the electronic device 11 can be a computer or a mobile phone.

The input circuit 200, the timing circuit 300, the display circuit 400, and the switch circuit 600 are all connected to the control circuit 500. The input circuit 200 is configured for receiving a designated power-off time delay, such as 10 minutes input by users, for the electronic device 11. The control circuit 500 receives the designated power-off time delay to generate a time signal to control the display circuit 400 to display the designated power-off time delay according to the time signal, for example 10 minutes, on a screen, then counts down 9:59, 9:58 and so on, and outputs a control signal controlling the control circuit 300 to time. When the time delay has elapsed, power-off time is reached, and the timing circuit 300 sends an instruction signal to the control circuit 500. The control circuit 500 controls the switch circuit 600 to shut off power of the electronic device 11 according to the instruction signal.

Figure 2:
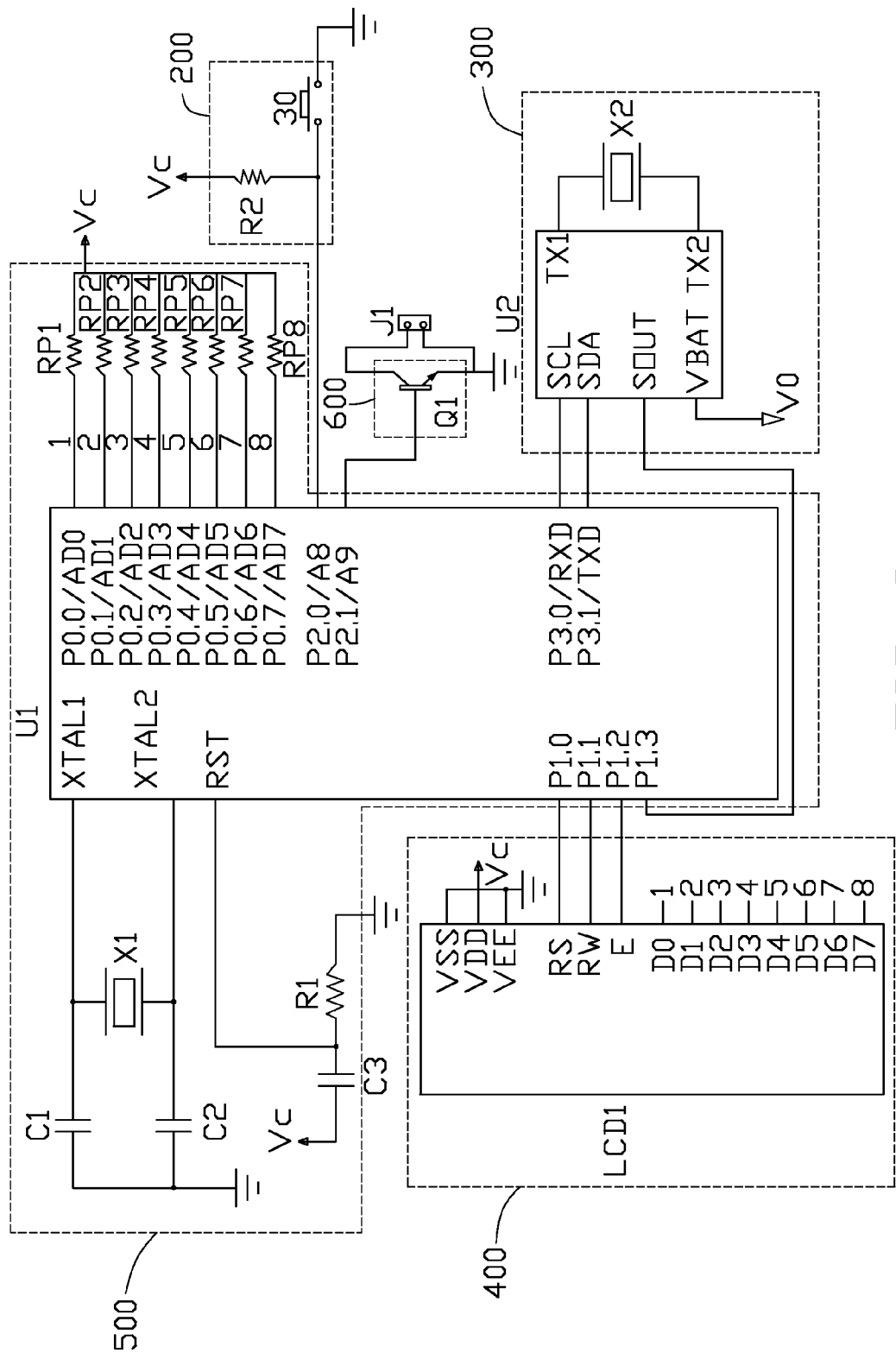
FIG. 2 is a circuit diagram of an exemplary embodiment of the automatic shut off apparatus for an electronic device of FIG. 1.

Referring to FIG. 2, the input circuit 200 includes a switch 30 and a resistor R2. A first terminal of the switch 30 is grounded, and a second terminal of the switch 30 is connected to a power supply Vc via the resistor R2, and is also connected to the control circuit 500. In one embodiment, the switch 30 is a normally open switch. The switch 30 as a regulating component is a push type switch. In other embodiments, the switch 30 can also be one of other types of switches. In one embodiment, the power supply Vc can be a 5-volt direct current (DC) power supply.

The timing circuit 300 includes a crystal oscillator X2 and a timing chip U2. The timing chip U2 includes a clock terminal SCL, a data terminal SDA, an output terminal SOUT, a power supply terminal VBAT, and two crystal connection terminals TX1 and TX2. The crystal oscillator X2 is connected between the two crystal connection terminals TX1 and TX2. The clock terminal SCL, the data terminal SDA and the output terminal SOUT are all connected to the control circuit 500. The power supply terminal VBAT is connected to a power supply V0. In one embodiment, the power supply V0 can be a 1.5-volt DC power supply.

Figure 3:
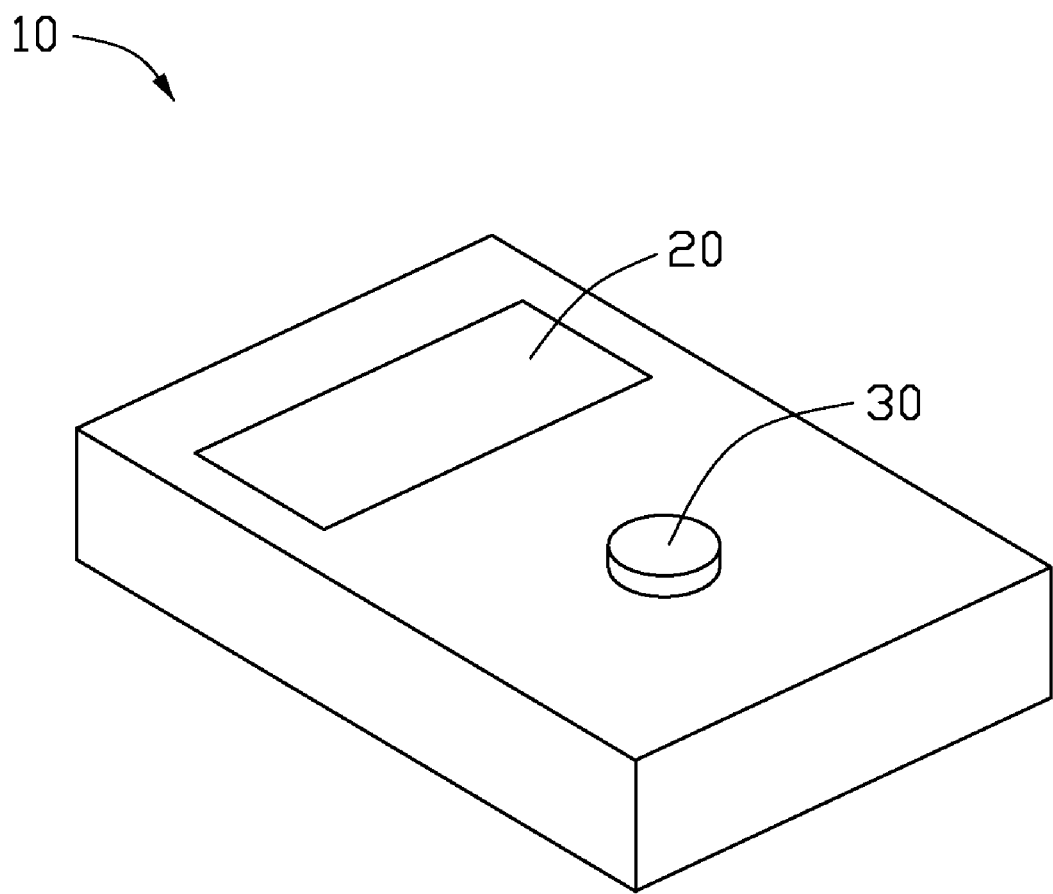
FIG. 3 is an isometric view of an exemplary embodiment of the automatic shut off apparatus for an electronic device of FIG. 1.

Referring to FIGS. 2 to 4, the display circuit 400 includes a display chip LCD1. The display chip LCD1 includes eight data pins D0-D7, three control pins RS, RW, E, a power supply terminal VDD, two ground terminals VSS, VEE, and a display screen 20. The data pins D0-D7 and the control pins RS, RW, E are all connected to the control circuit 500. The power supply terminal VDD is connected to the power supply Vc. The ground terminals VSS, VEE are grounded. In one embodiment, the display screen 20 can be a liquid crystal display (LCD) screen. In other embodiments, the display screen 20 can be one of other types of display screens.

The control circuit 500 includes a control chip U1, eight pull-up resistors RP1-RP8, a resistor R1, three capacitors C1-C3, and a crystal oscillator X1. The pull-up resistors RP1-RP8 are configured for dividing. The control chip U1 includes eight data pins P0.0/AD0, P0.1/AD1, P0.2/AD2, P0.3/AD3, P0.4/AD4, P0.5/AD5, P0.6/AD6, P0.7/AD7, four control pins P1.0-P1.3, a reset pin RST, two crystal terminals XTAL1, XTAL2, and four pins P2.0/A8, P2.1/A9, P3.0/RXD, P3.1/TXD. The data pins P0.0/AD0, P0.1/AD1, P0.2/AD2, P0.3/AD3, P0.4/AD4, P0.5/AD5, P0.6/AD6, and P0.7/AD7 of the control chip U1 are connected to the corresponding data pins D0-D7 of the display chip LCD1, and also connected to the power supply Vc via the pull-up resistors RP1-RP8 respectively. The crystal oscillator X1 is connected between the crystal terminals XTAL1, XTAL2 of the control chip U1. The crystal terminal XTAL1 is also grounded via the capacitor C1. The crystal terminal XTAL2 is also grounded via the capacitor C2. The capacitors C1, C2, and the crystal oscillator X1 as a clock circuit provide accurate clock to the control chip U1. The reset pin RST is grounded via the resistor R1, and is connected to the power supply Vc via the capacitor C3. The resistor R1 and the capacitor C3 as a resetting circuit can assist in resetting for the control chip U1. The control pins P1.0-P1.2 are respectively connected to the control pins RS, RW, and E of the display chip LCD1. The control pin P1.3 is connected to the output terminal SOUT of the timing chip U2. The pin P2.0/A8 is connected to a node between the resistor R2 and the switch 30. The pin P2.1/A9 is connected to the switch circuit 600. The pin P3.0/RXD is connected to the clock terminal SCL of the timing chip U2. The pin P3.1/TXD is connected to the data terminal SDA of the timing chip U2.

The switch circuit 600 includes a transistor Q1. A base of the transistor Q1 is connected to the pin P2.1/A9 of the control chip U1, a collector and an emitter of the transistor Q1 are configured to be connected to two terminals of a power connector J1 of the electronic device 11, the emitter of the transistor Q1 is also grounded. In one embodiment, the transistor Q1 as an electronic switch is an NPN transistor. In other embodiments, the transistor Q1 may be one of other types of electronic switches, such as a field effect transistor.

In use, the collector and emitter of the transistor Q1 are connected to the two terminals of the power connector J1 of the electronic device 11. The power supplies Vc and V0 are powered. The switch 30 is triggered to set a designated power-off time delay for the electronic device 11, for example, pushing down the switch 30 one time indicates setting the designated power-off time delay to be 10 minutes, pushing down the switch 30 twice indicates setting the designated power-off time delay to be 20 minutes, and so on. In this embodiment, the designated power-off time delay of 10 minutes is used as an example. The pin P2.0/A8 of the control chip U1 receives the designated power-off time delay to generate a time signal. The control pins P1.0-P1.2 send a display signal to the control pins RS, RW, and E of the display chip LCD1 respectively. The control chip U1 sends the time signal to the data pins D0-D7 of the display chip LCD1 via the data pins P0.0/AD0, P0.1/AD1, P0.2/AD2, P0.3/AD3, P0.4/AD4, P0.5/AD5, P0.6/AD6, and P0.7/AD7 of the control chip U1. Therefore, the designated power-off time delay is displayed on the display screen 20 and begins counting down. In addition, the control chip U1 sends the control signal to the clock terminal SCL and the data terminal SDA of the timing chip U2 respectively via the pin P3.0/RXD and the pin P3.1/TXD. The timing chip U2 is to time according to vibrations of the crystal X2. When the time of the crystal X2 equals the designated power-off time delay, the timing chip U2 sends the instruction signal to the control pin P1.3 of the control chip U1 via the output terminal SOUT. The pin P2.1/A9 of the control chip U1 is at high level, such as logic 1. The transistor Q1 is turned on. A voltage level between the two terminals of the power connector J1 of the electronic device 11 is low, such as logic 0, and the electronic device 11 is automatically shut off.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. An automatic shut off apparatus for an electronic device, the apparatus comprising:
    an input circuit for setting a designated power-off time delay for the electronic device;
    a control circuit to receive the designated power-off time delay from the input circuit, and output a control signal;
    a timing circuit to time according to the control signal, wherein the timing circuit outputs an instruction signal in response to the designated power-off time delay;
    a switch circuit to shut off power of the electronic device according to the instruction signal; and
    a display circuit connected to the control circuit, to display the designated power-off time delay.

2. The apparatus of claim 1, wherein the input circuit comprises a regulating component connected to the control circuit, for setting the designated power-off time delay for the electronic device.

3. The apparatus of claim 2, wherein the regulating component is a push type switch, a first terminal of the switch is grounded, and a second terminal of the switch is connected to a power supply via a resistor, the second terminal of the switch is also connected to the control circuit.

4. The apparatus of claim 1, wherein the timing circuit comprises a crystal oscillator and a timing chip, the timing chip comprises a clock terminal, a data terminal, an output terminal, a power supply terminal, and two crystal connection terminals; the crystal oscillator is connected between the two crystal connection terminals; the clock terminal, the data terminal, and the output terminal are all connected to the control circuit, the power supply terminal is connected to a power supply; and wherein the timing circuit is configured to receive the control signal from the control circuit via the clock terminal and the data terminal to time, and send the instruction signal to the control circuit via the output terminal in response to the designated power-off time delay.

5. The apparatus of claim 4, wherein the power supply is a 1.5-volt direct current power supply.

6. The apparatus of claim 1, wherein the display circuit comprises a display chip; the display chip comprises a plurality of data pins, a plurality of control pins, a power supply terminal, a ground terminal, and a display screen, the plurality of data pins and the plurality of control pins are all connected to the control circuit, the power supply terminal is connected to a power supply, and the ground terminal is grounded.

7. The apparatus of claim 6, wherein the display screen is a liquid crystal display screen.

8. The apparatus of claim 1, wherein the control circuit comprises a control chip, a clock circuit, and a resetting circuit, the control chip comprises a control pin, and first to fourth pins; the control chip is connected to the clock circuit and the resetting circuit; the first pin is connected to the input circuit to receive the designated power-off time delay; the second pin is connected to the switch circuit; the control pin, the third and fourth pins are connected to the timing circuit; wherein the timing circuit receives the control signal from the third and fourth pins of the control circuit to time, the timing circuit sends the instruction signal to the control pin of the control circuit in response to the designated power-off time delay, the second pin controls the switch circuit to shut off power of the electronic device.

9. The apparatus of claim 1, wherein the switch circuit comprises an electronic switch connected between the electronic device and the control circuit, and wherein the control circuit controls the electronic switch to shut off the electronic device in response to the control circuit receiving the instruction signal.

10. The apparatus of claim 9, wherein the electronic switch is an NPN transistor, a base of the transistor is connected to the control circuit, a collector and an emitter of the transistor are connected to two terminals of a power connector of the electronic device respectively.

11. An automatic shut off apparatus for an electronic device at a designated power-off time delay, the apparatus comprising:
    an input circuit for setting the designated power-off time delay for the electronic device;
    a control circuit to receive the designated power-off time delay from the input circuit, and output a control signal;
    a timing circuit to time according to the control signal, wherein the timing circuit outputs an instruction signal to shut off power of the electronic device in response to the designated power-off time delay; and
    a display circuit connected to the control circuit, to display the designated power-off time delay.

12. The apparatus of claim 11, wherein the input circuit comprises a regulating component connected to the control circuit, for setting the designated power-off time delay for the electronic device.

13. The apparatus of claim 11, wherein the timing circuit comprises a crystal oscillator and a timing chip; the timing chip comprises a clock terminal, a data terminal, an output terminal, a power supply terminal, and two crystal connection terminals; the crystal oscillator is connected between the two crystal connection terminals; the clock terminal, the data terminal, and the output terminal are all connected to the control circuit, the power supply terminal is connected to a power supply, and wherein the timing circuit is configured to receive the control signal from the control circuit via the clock terminal and the data terminal to time, and send an instruction signal to the control circuit via the output terminal in response to the designated power-off time delay.

14. The apparatus of claim 11, wherein the control circuit comprises a control chip, a clock circuit, and a resetting circuit, the control chip comprises a control pin, and first to fourth pins, the control chip is connected to the clock circuit and the resetting circuit; the first pin is connected to the input circuit to receive the designated power-off time delay; the second pin is connected to the electronic device; the control pin, the third and fourth pins are connected to the timing circuit; wherein the timing circuit is configured to receive the control signal from the third and fourth pins of the control circuit to time, the timing circuit send the instruction signal to the control pin of the control circuit in response to the designated power-off time delay, the second pin shuts off power of the electronic device.

* * * * *